(12) United States Patent
McLoughlin et al.

(10) Patent No.: US 7,112,022 B1
(45) Date of Patent: Sep. 26, 2006

(54) RESTRAINING APPARATUS

(76) Inventors: John E. McLoughlin, 185 Lincoln Blvd., Hauttauge, NY (US) 11788; Neocles G. Athanasiades, 6 Mayeeck Dr., Setauket, NY (US) 11723; Toh K. Meng, 15 Sunflower Dr., Hauppauge, NY (US) 11788

( * ) Notice: Subject to any disclaimer, the term of this patent is extended or adjusted under 35 U.S.C. 154(b) by 0 days.

(21) Appl. No.: 11/123,161

(22) Filed: May 6, 2005

(51) Int. Cl.
*B60P 7/08* (2006.01)
(52) U.S. Cl. ............................ 410/96; 410/97; 410/156
(58) Field of Classification Search .................. 410/8, 410/10–12, 96, 97, 104, 156; 104/91–92, 104/139; 248/499; 188/42, 44; 182/3; 482/43, 482/69; 5/85.1; 296/19
See application file for complete search history.

(56) References Cited

U.S. PATENT DOCUMENTS

| 5,997,444 | A  | * | 12/1999 | McBride |
| 6,287,062 | B1 | * | 9/2001  | Vallance ...................... 410/97 |
| 6,837,656 | B1 | * | 1/2005  | Prusinowski et al. ......... 410/30 |

* cited by examiner

*Primary Examiner*—Stephen Gordon
(74) *Attorney, Agent, or Firm*—Frank L. Hart

(57) ABSTRACT

Apparatus is provided for restraining an individual in the cargo area of a vehicle. Such restraints can be utilized to protect medical technicians in ambulances, fire rescue trucks and other emergency vehicles. The apparatus is constructed so that the user can control the amount of restraint on his various body movements while he medically treats a patient.

17 Claims, 1 Drawing Sheet

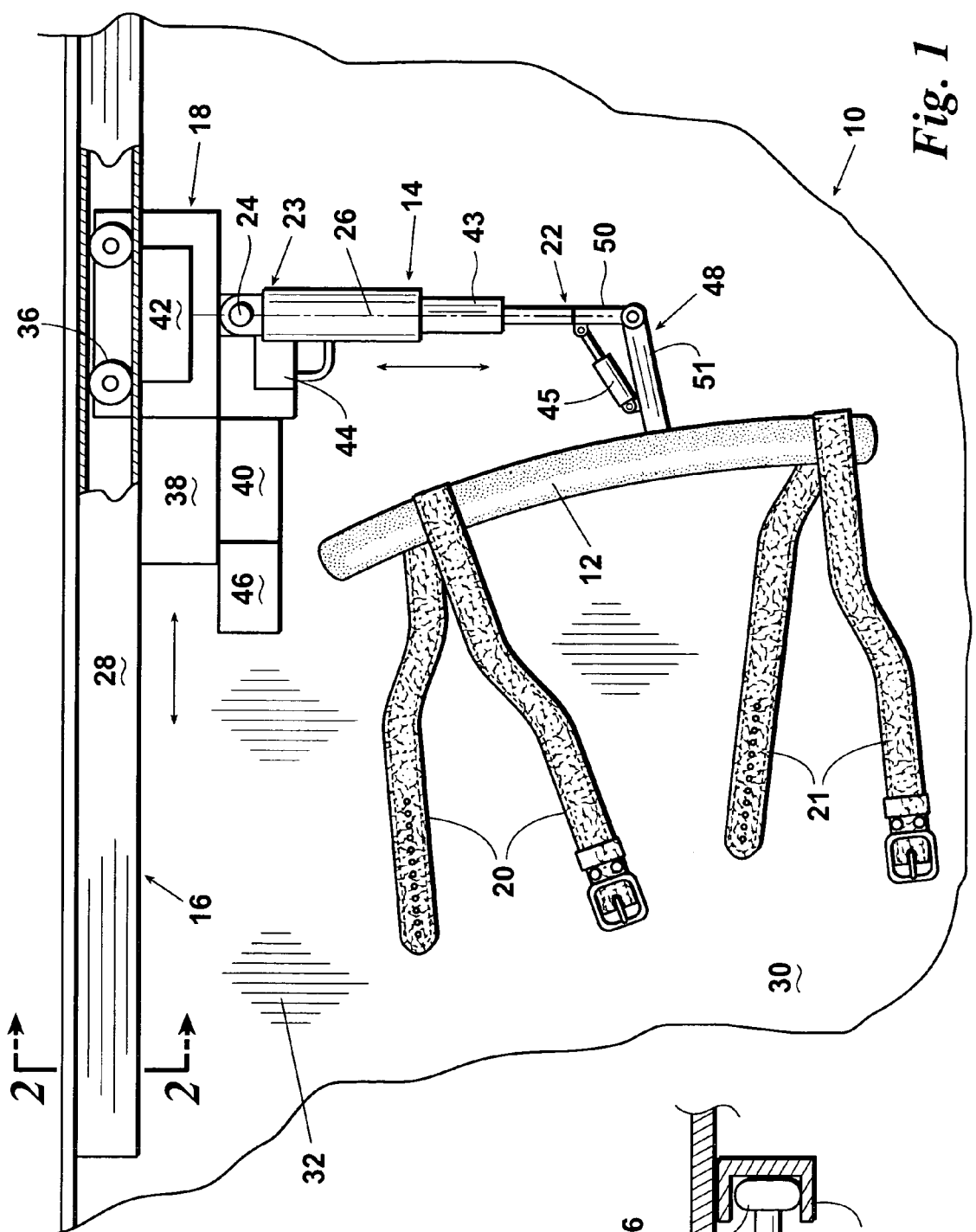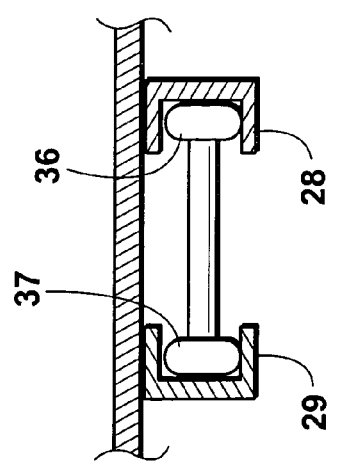

RESTRAINING APPARATUS

CROSS REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

The subject invention relates to restraining apparatus for maintaining an individual against movement in the interior of a cargo area of a vehicle.

More particularly, the subject invention relates to restraining apparatus for controllably maintaining an individual medical technician, for example, against movement in the interior of an ambulance, for example.

2. Description of Related Art Including Information Disclosed Under 37 CFR 1.97 and 1.98

In the course of their duties, medical personnel ride in the cargo area of an ambulance, truck, or rescue vehicles and administer to a patient's needs. The patient is normally lying on a stretcher or gurney which is restrained against movement relative to the vehicle while the attending medical personnel are not restrained.

Often, unrestrained medical personnel sustain injuries when the vehicle is involved in an accident or makes an unusually sharp turn.

The subject invention is directed to apparatus to restrain the attending medical personal against movement within the interior of a vehicle.

BRIEF SUMMARY OF THE INVENTION

In one aspect of the invention, an apparatus is provided for controllably restraining an individual against movement. The apparatus has a body frame, a telescopically moveable arm, a rail system and a carriage system. The body frame has straps extendable about the head and torso of an individual. The telescopically moveable arm has first and second end portions. The first end portion is connectable to the body frame and the second end portion has a swivel. The rail system is connectable to and extendable along the interior of a cargo area of a vehicle. The carriage system has a braking system and is moveably connected to the rail system for movement therealong. The carriage system is connectable to the swivel of the moveable arm.

BRIEF DESCRIPTION OF THE SEVERAL VIEWS OF THE DRAWING(S)

FIG. 1 is a side view of a portion of the cargo area of a vehicle with the apparatus of this invention installed in the cargo area; and FIG. 2 is an end view of the preferred rail system of this invention.

DETAILED DESCRIPTION OF THE INVENTION

Referring to FIG. 1, an apparatus 10 is shown for restraining an individual against movement. The apparatus has a body frame 12 a telescopically moveable arm 14, a rail system 16, and a carriage system 18. The body frame 12 has first and second straps 20,21 with securing buckles extendable about a respective head and torso of an individual. The body frame 12 is substantially rigid and is of a size sufficient for extending from in individuals head to his hips.

The telescopically moveable arm 14 has first and second end portions 22,23. The first end portion 22 is connectable to the body frame 12 and the second end portion is a swivel connector adapted to allow rotational movement about the longitudinal axis 26 of the moveable arm 14.

Referring to FIGS. 1 and 2, the rail system 16 preferably consists of first and second spaced apart rails 28,29 connectable and extendable along the interior of a cargo area 30 of a vehicle 32.

The carriage system 18 has braking apparatus associated therewith and is moveably connected to the rail system 16 for movement therealong. The carriage system 18 is connectable to the swivel 24 of the telescopically moveable arm 14.

The carriage system 18 has first and second sets of wheels 36, 37 connected to the carriage system on opposed sides thereof. In the preferred embodiment each set of wheels 36,37 comprises at least 2 wheels. It should be understood however, that each set of wheels 36, can each comprise a lesser or greater number of wheels without departing from this invention.

The wheels 36,37 of the carriage system 18 are connected to the rail system 16. The rail system 16 is of a construction to moveably maintain the carriage system 18 with the rail system 16 in the preferred embodiment, best seen in FIG. 2, each rail 28,29 is of a channel configuration which traps the wheels therein. It should be understood that the rail system 16 can be of other construction without departing from this invention.

A braking system 38, preferably a hydraulic braking system, is provided and serves various portions of the apparatus of this invention. The braking apparatus of the various portions of the invention include hydraulic cylinders 42–45. The braking system is connected to a sensor-signaling apparatus 40 which is adapted to sense sudden G forces and apply braking forces to maintain against rolling movement of the carriage system 18 in response to sensed G forces greater than a preselected magnitude. The preselected G force magnitude at which braking action and the magnitude of braking is applied to the carriage system 18 and other portions of the apparatus, is adjustable by a user via controller 46.

The first end portion 22 of the telescopically moveable arm 14 is connected to the body frame 12 via a sub-arm 48 which is rotatable about the axis 26 of the telescopically moveable arm 14. The sub-arm comprises first and second parts 50,51 that are pivotally connected one to the other for pivotal movement of the body frame 12 in a direction along the longitudinal axis of the moveable arm 14.

The braking system 38 of this invention, thorough hydraulic cylinders 42,45 provide braking of rolling movement of the carriage system 18, telescopic movement of the arm 14, rotational movement about the axis 26 of the arm 14, and pivotal movement of the body frame 12. As described above, the controller 46 can be used to selectively adjust the magnitude of braking by each hydraulic cylinder 42–45 and the magnitude of G forces that trigger applying of each brake. The sensing-signaling 40 is adapted to automatically apply maximum braking to all cylinders 42–45 in response to sensing undesirably high and dangerous G forces. The controller 42 can also be turned off and place the apparatus 10 in a state where there is no braking by the cylinders. In another operating mode, the controller 46 can be adjusted to maintain a selected orientation. In this mode, the operator can position himself as desired and then lock the system in place thereby steadying his body while he performs his various operations. By so steadying himself against movement relative to the vehicle, the operator can remove some weight off his legs, support his back in strained positions and significantly reduce muscle fatigue.

In other uses of the apparatus 10 of this invention, a medical technician can strap himself into the body frame 12, use the controller 46 to adjust the magnitude of G forces at which each cylinder will be energized and the magnitude of braking. As time passes and his patient duties change, the technician may need to change the magnitude settings in order to permit greater freedom of movement. Large G forces like caused by a vehicle accident, will be sensed and maximum braking forces will be applied to all braking components in response thereto.

Other aspects, objects, and advantages can be obtained by a study of the drawings, the disclosure and the appended claims.

What is claimed is:

1. An apparatus for controllably restraining an individual against movement, comprising:
    a body frame having straps extendable about a respective head and torso of an individual;
    a telescopically moveable arm having first and second end portions, said first end portion connectable to the body frame and said second end portion having a swivel;
    a rail system connectable and extendable along an interior of a cargo area of a vehicle;
    a carriage system having a braking system and being moveably connected to the rail system for movement therealong, said carriage system being connectable to the swivel of the moveable arm, said braking system being a hydraulic braking system and the braking system being connected to a sensor-signaling apparatus adapted to sense sudden G forces and apply braking forces to the carriage system in response to sensing G forces greater than a preselected magnitude.

2. An apparatus, as set forth in claim 1, wherein the rail system is connected to a roof for the vehicle cargo area and extends along a longitudinal axis of the cargo area.

3. An apparatus, as set forth in claim 1, wherein the rail system includes first and second spaced apart rails.

4. An apparatus, as set forth in claim 3, wherein the carriage system has wheels rollably connected to the rail system and said rail system is of a construction to moveably maintain the carriage system with the rail system.

5. An apparatus, as set forth claim 1, wherein the preselected magnitude at which braking forces are applied to the carriage system is adjustable by a user of the apparatus.

6. An apparatus, as set forth in claim 1, wherein the first end portion of the telescopically moveable arm is connected to the body frame via a sub-arm, said sub-arm being rotatable about an axis of the telescopically moveable arm.

7. An apparatus, as set forth in claim 6, wherein the sub-arm is pivotally connected to the body frame for pivotal movement of the body frame in a direction along a longitudinal axis of the moveable arm.

8. An apparatus, as set forth in claim 1, wherein the braking system is a hydraulic system actuateable through hydraulic cylinders and adapted to controllably restrain movement of the carriage system along the associated rail system.

9. An apparatus, as set forth in claim 8, wherein the braking system is adapted to controllably restrain rotatable movement of the telescopically moveable arm relative to the carriage system.

10. An apparatus, as set forth in claim 9, wherein the braking system for restraining the rotatable movement of the telescopically moveable arm is connected to a sensor-signaling apparatus adapted to sense sudden G forces and apply braking forces to the rotatable movement of the moveable arm in response to sensed G forces being greater than a preselected magnitude.

11. An apparatus, as set forth in claim 9, wherein the braking system for restraining the rotatable movement of the telescopically moveable arm is connected to a sensor-signaling apparatus adapted to sense sudden G forces and apply braking forces to the rotatable movement of the moveable arm in response to sensed G forces being greater than a chosen magnitude, said chosen magnitude at which braking forces are applied to the rotatable movement of the moveable arm is adjustable by a user of the apparatus.

12. An apparatus, as set forth in claim 8, wherein the braking system is adapted to controllably restrain telescopic movement of the moveable arm.

13. An apparatus, as set forth in claim 12, wherein the braking system for restraining the telescopic movement for the telescopically moveable arm is connected to a sensor-signaling apparatus adapted to sense sudden G forces and apply braking forces to the telescopic movement of the moveable arm in response to sensed G forces being greater than a preselected magnitude.

14. An apparatus, as set forth in claim 12, wherein the braking system for restraining the telescopic movement for the telescopically moveable arm is connected to a sensor-signaling apparatus adapted to sense sudden G forces and apply braking forces to the telescopic movement of the moveable arm in response to sensed G forces being greater than a chosen magnitude, said chosen magnitude at which braking forces are applied to the telescopic movement of the moveable arm is adjustable by a user of the apparatus.

15. An apparatus, as set forth in claim 8, wherein the body frame is substantially rigid and the braking system is adapted to controllably restrain pivotal movement of the body frame along a longitudinal axis of the moveable arm.

16. An apparatus, as set forth in claim 15, wherein the braking system for restraining the pivotal movement of the body frame relative to and along the longitudinal axis of the moveable arm is connected to a sensor-signaling apparatus adapted to sense sudden G forces and apply braking forces to the pivotal movement of the body frame in response to sensed G forces being greater than a preselected magnitude.

17. An apparatus, as set forth in claim 15, wherein the braking system for restraining the pivotal movement of the body frame relative to and along the longitudinal axis of the moveable arm is connected to a sensor-signaling apparatus adapted to sense sudden G forces and apply braking forces to the pivotal movement of the body frame in response to sensed G forces being greater than a chosen magnitude, said chosen magnitude at which braking forces are applied to the pivotal movement of the body frame is adjustable by a user of the apparatus.

* * * * *